(12) United States Patent
Tanaka et al.

(10) Patent No.: US 7,216,827 B2
(45) Date of Patent: May 15, 2007

(54) SEATBELT RETRACTOR AND SEATBELT DEVICE

(75) Inventors: Koji Tanaka, Moriyama (JP); Koji Inuzuka, Shiga-ken (JP)

(73) Assignee: Takata Corporation, Tokyo (JP)

( * ) Notice: Subject to any disclaimer, the term of this patent is extended or adjusted under 35 U.S.C. 154(b) by 315 days.

(21) Appl. No.: 10/861,515

(22) Filed: Jun. 7, 2004

(65) Prior Publication Data

US 2005/0082410 A1    Apr. 21, 2005

(30) Foreign Application Priority Data

Oct. 15, 2003   (JP)   ............................. 2003-355294

(51) Int. Cl.
*B65H 75/48*   (2006.01)

(52) U.S. Cl. ..................... 242/390.8; 280/806; 280/807

(58) Field of Classification Search ............. 242/390.8, 242/390.9; 280/806, 807; 297/475
See application file for complete search history.

(56) References Cited

U.S. PATENT DOCUMENTS

| 5,788,281 A | 8/1998 | Yanagi et al. |
| 6,499,554 B1 | 12/2002 | Yano et al. |

FOREIGN PATENT DOCUMENTS

| DE | 102 04 477 | 8/2003 |
| JP | 2002-104135 | 4/2002 |

*Primary Examiner*—John Q. Nguyen
(74) *Attorney, Agent, or Firm*—Manabu Kanesaka

(57) ABSTRACT

A seatbelt retractor includes a spool for winding a seatbelt, a motor for generating rotational torque to rotate the spool, a clutch mechanism for connecting a power transmission path to transmit rotational torque of the motor to the spool in a connected mode and for disconnecting the power transmission path in a disconnected mode, and a clutch mechanism disconnection detecting device for detecting disconnection of the clutch mechanism. A motor control device stops the motor according to a detection signal from the clutch mechanism disconnection detecting device.

14 Claims, 9 Drawing Sheets

SEATBELT RETRACTOR AND SEATBELT DEVICE

BACKGROUND OF THE INVENTION AND RELATED ART STATEMENT

The present invention relates to a seatbelt retractor to be installed in a vehicle such as an automobile or the like for retracting a seatbelt with a motor to restrain and protect a passenger and, more specifically, relates to a seatbelt retractor including a clutch mechanism for efficiently retracting a seatbelt with small power consumption. The present invention also relates to a seatbelt device provided with the seatbelt retractor.

Conventionally, a seatbelt device is installed in a vehicle such as an automobile or the like, and in case of emergency when great deceleration acts upon a vehicle in a collision or the like, a seatbelt restrains a passenger so as to prevent the passenger from being thrown out of the seat, thereby protecting the passenger. Such a seatbelt device includes a seatbelt retractor for retracting the seatbelt. The seatbelt retractor includes forcing means such as a spiral spring or the like for forcing a spool to rotate in a belt-retracting direction all the times for winding the seatbelt thereon. That is, the seatbelt is wound onto the spool due to the force of the forcing means when the passenger does not wear the seatbelt.

On the other hand, the seatbelt is extracted against the force of the forcing means when the passenger wears the seatbelt. The seatbelt retractor has lock means for prohibiting rotation of the spool in a belt-extracting direction in case of emergency such as the aforementioned examples, thereby prohibiting extraction of the seatbelt in case of emergency. Thus, with the seatbelt, the passenger is restrained and protected in a sure manner in case of emergency.

In such a conventional seatbelt device, a generally constant belt tension is applied to the seatbelt with the forcing means at the time of wearing the seatbelt. Accordingly, the seatbelt retractor operates generally in a single mode regardless of a situation of the vehicle including the seatbelt device and the surroundings thereof. In this case, while the conventional seatbelt device restrains and protects the passenger in a sure manner in case of emergency as described above, the seatbelt is not controlled so as to provide comfortable wearing for the passenger in situations other than emergency. Furthermore, there is increased demand for a seatbelt wherein the passenger is more stably restrained so as to be protected in a surer manner in case of emergency.

Japanese Patent Publication (Kokai) No. 2002-104135 has disclosed a passenger restraining/protecting system in which a motor is provided for controlling rotation of the spool of the seatbelt retractor corresponding to a situation of the vehicle including the seatbelt device and the surroundings thereof so as to adjust belt tension, thereby more efficiently restraining and protecting the passenger, and providing more comfortable wearing for the passenger.

In the seatbelt retractor disclosed in Japanese Patent Publication (Kokai) No. 2002-104135, when the motor is not driven, a power transmission path for transmitting the driving force of the motor to the spool is disconnected so that the driving force is not transmitted to the spool, and both the motor and the spool rotate freely. When the motor is driven in the belt-retracting direction (referred to as forward rotational direction) for retracting the seatbelt, the power transmission path is connected through the forward rotation of the motor, thereby transmitting the driving force of the motor to the spool. Accordingly, the seatbelt retractor is controlled so that the spool rotates in the belt-retracting direction so as to retract the seatbelt by the driving force of the motor, thereby increasing the belt tension. Furthermore, in this case, when the motor rotates in the reverse direction for releasing the seatbelt, the power transmission path is disconnected. As a result, both the motor and the spool rotate freely, i.e., the spool is not affected by the driving force of the motor.

As described above, in the seatbelt retractor disclosed in Japanese Patent Publication (Kokai) No. 2002-104135, when the motor rotates, the clutch for controlling the power transmission path is connected so as to connect the power transmission path. On the other hand, when the motor rotates in reverse, the clutch is disconnected so as to shut off the power transmission path.

In the seatbelt retractor disclosed in Japanese Patent Publication (Kokai) No. 2002-104135, it is necessary to stop the motor after the power transmission path is disconnected and the clutch of the power transmission path turns off. Accordingly, in a conventional seatbelt retractor, a period of time for reverse rotation is set based on a period of time from the start of the reverse rotation of the motor to completion of disconnecting the clutch. In this case, the period of time required for disconnecting the clutch varies according to an operating situation of the retractor. Accordingly, the period of time for the reverse rotation is set to be a maximum period of time required for disconnecting the clutch in every situation. As a result, in every situation, the motor stops driving after completion of disconnecting the clutch in a sure manner.

However, when a fixed period of time for the reverse rotation of the motor for disconnecting the clutch is set, the motor rotates in reverse for a relatively long time in most ordinary situations, thereby always generating mechanical noise. While the mechanical noise causes no particular problem in the seatbelt retractor disclosed in Japanese Patent Publication (Kokai) No. 2002-104135, the mechanical noise is preferably suppressed as much as possible.

In view of the problems described above, the present invention has been made, and an object of the invention is to provide a seatbelt retractor having a configuration wherein power consumption of the motor is reduced and a mechanical noise is suppressed when the clutch is disconnected.

Another object of the invention is to provide a seatbelt device provided with the seatbelt retractor.

Further objects and advantages of the invention will be apparent from the following description of the invention.

SUMMARY OF THE INVENTION

In order to achieve the objects described above, according to a first aspect of the present invention, a seatbelt retractor comprises a spool for winding a seatbelt; a motor for generating rotational torque for rotating the spool; a clutch mechanism for connecting a power transmission path to transmit rotational torque of the motor to the spool in a connected mode and for disconnecting the power transmission path in a disconnected mode; clutch mechanism disconnection detecting means for detecting disconnection of the clutch mechanism; and a motor control device for stopping driving of the motor according to a detection signal from the clutch mechanism disconnection detecting means.

According to a second aspect of the present invention, the clutch mechanism disconnection detecting means comprises motor current detecting means for detecting a motor current in the motor. When it is determined that a motor current detection signal from the motor current detecting means matches a predetermined value, the motor control device stops driving of the motor.

According to a third aspect of the present invention, the clutch mechanism can move between a connected position for connecting the power transmission path and a disconnected position for disconnecting the power transmission path, and includes a clutch gear for engaging a gear connected to the motor. The clutch gear includes clutch gear stopping/holding means for stopping rotation of the clutch gear when the clutch gear is located at the disconnected position.

According to a fourth aspect of the present invention, the clutch gear stopping/holding means is formed of teeth for engaging the clutch gear.

According to a fifth aspect of the present invention, the clutch mechanism can move between a connected position for connecting the power transmission path and a disconnected position for disconnecting the power transmission path, and includes a clutch gear for engaging a gear connected to the motor and resistance applying means for applying resistance to rotation of the clutch gear when the clutch gear is located at the disconnected position.

According to a sixth aspect of the present invention, a seatbelt device is provided with the seatbelt retractor in the first aspect of the invention.

In the seatbelt retractor according to one of the first to fifth aspects, when the clutch mechanism is disconnected, the motor control device stops the motor, thereby minimizing a period of time for driving the motor after the clutch mechanism is disconnected. Accordingly, the power consumption of the motor is effectively reduced.

In the seatbelt retractor according to one of the second to fifth aspects, when the clutch mechanism is disconnected and the motor current becomes a predetermined value, the motor control device stops the motor, thereby reducing power consumption of the motor in a surer manner.

In the seatbelt retractor according to one of the third and fourth aspects, when the clutch gear is located at the clutch disengaged position, the clutch gear stopping/holding means prohibits rotation of the clutch gear, thereby increasing the motor current relatively rapidly. Accordingly, it is possible to rapidly detect disconnection of the clutch mechanism in a sure manner, thereby effectively reducing power consumption of the motor and noise generated due to rotation of the clutch gear. In particular, in the seatbelt retractor according to the fourth aspect, the clutch gear stopping/holding means is formed of teeth engaging the clutch gear, thereby prohibiting rotation of the clutch gear when the clutch mechanism is disconnected and reducing power consumption of the motor and noise with a simple structure.

BRIEF DESCRIPTION OF THE DRAWINGS

FIGS. 3(a) and 3(b) are views showing a sun gear member in the seatbelt retractor shown in FIG. 1, wherein FIG. 3(a) is a perspective view thereof, and FIG. 3(b) is a perspective view as viewed from a direction 3(b) in FIG. 3(a);

DETAILED DESCRIPTION OF PREFERRED EMBODIMENTS

Figure 1:
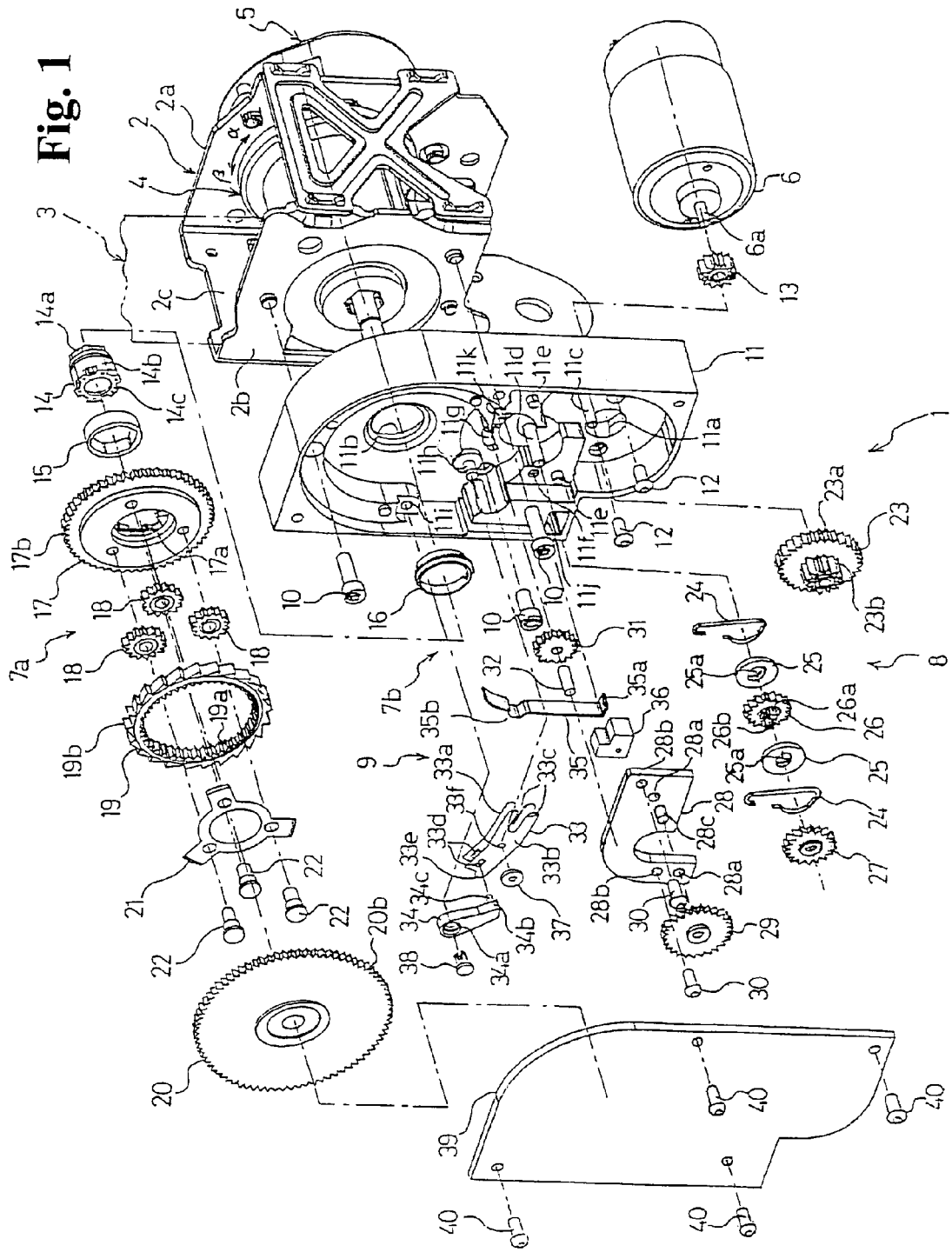
FIG. 1 is an exploded perspective view showing a seatbelt retractor according to an embodiment of the present invention.
Figure 2:
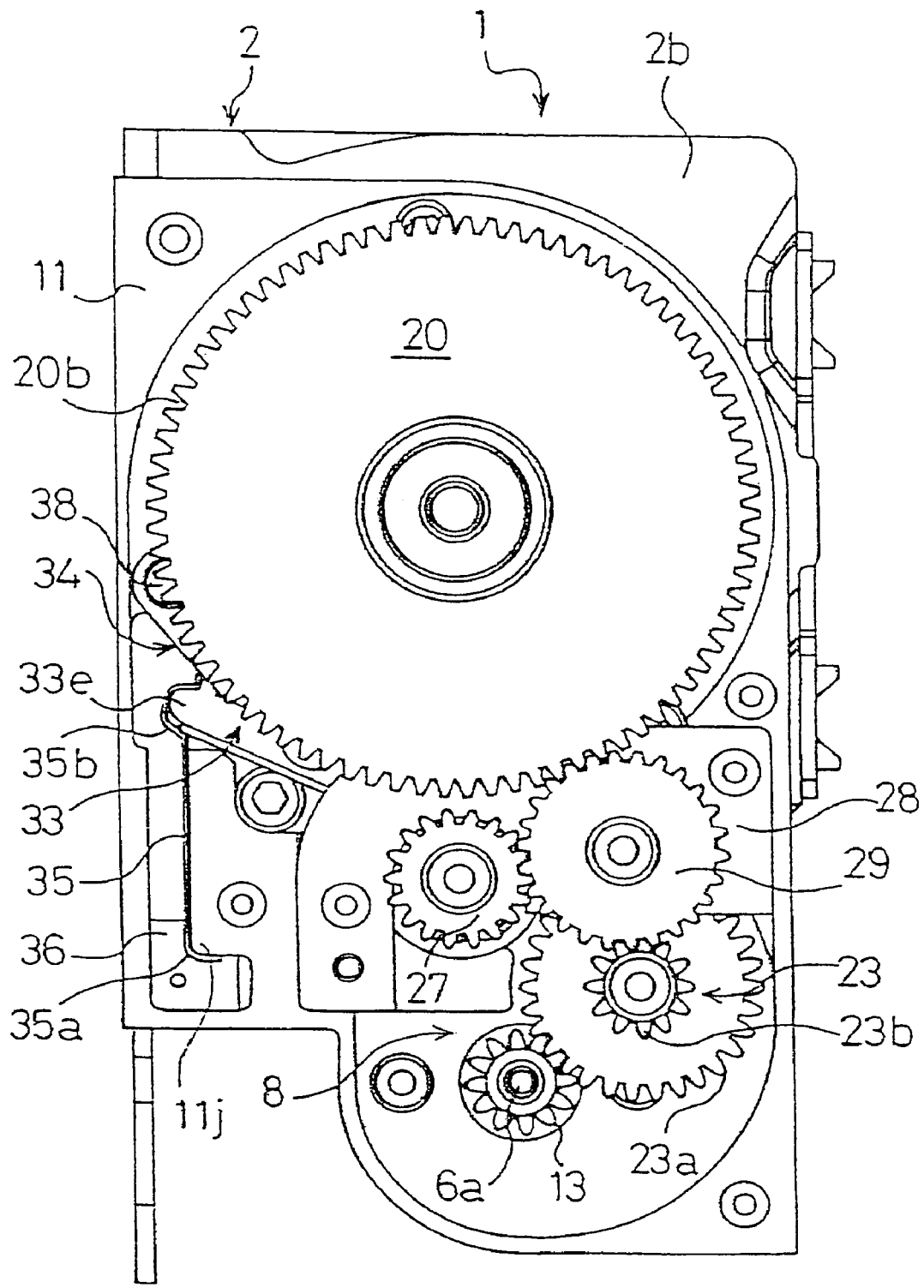
FIG. 2 is a left side view of the seatbelt retractor shown in FIG. 1 without a retainer cover.

Hereunder, embodiments of the present invention will be explained with reference to the accompanying drawings. FIG. 1 is an exploded perspective view showing a seatbelt retractor according to an embodiment of the present invention. FIG. 2 is a left side view of the seatbelt retractor shown in FIG. 1 without a retainer cover. Note that "left" and "right" will represent the left and right sides in the drawings, respectively, unless noted otherwise. Furthermore, "clockwise" and "counterclockwise" represent the clockwise and counterclockwise directions in the drawings, respectively.

As shown in FIG. 1, a seatbelt retractor 1 according to the present embodiment primarily comprises a frame 2; a seatbelt 3 for restraining the passenger when necessary; a spool 4 for winding the seatbelt 3 thereon; lock means 5 disposed on one side of the frame 2 for prohibiting rotation of the spool 4 in the belt-extracting direction α upon large deceleration greater than a predetermined level in a collision or the like; a motor 6 for generating rotational torque applied to the spool 4; a power transmission gear mechanism 8 having a first power transmission path and a second power transmission path for transmitting the rotational torque of the motor 6 to the spool 4 through one of the first power transmission path and the second power transmission path, and having a high reduction ratio reducing mechanism 7a for reducing rotation of the motor 6 with a relatively high reduction ratio to transmit the reduced rotation to the spool 4 and a low reduction ratio reducing mechanism 7b for reducing rotation of the motor 6 with a relatively low reduction ratio to transmit the reduced rotation to the spool 4; and a power transmission mode switching mechanism 9 for switching between the first power transmission path and the second power transmission path of the power transmission gear mechanism 8.

The frame 2 is formed of a pair of side walls 2a and 2b in parallel to each other and a back plate 2c connecting the side walls 2a and 2b. The spool 4 is rotatably disposed between the side walls 2a and 2b within the flame 2 for winding the seatbelt 3 thereon. A conventionally-known and widely-used spool may be employed as the spool 4 of the seatbelt retractor 1. The lock means 5 is attached to the side wall 2a. A conventionally-known and widely-used lock means may be employed as the lock means 5. When a vehicle sensor (deceleration sensor) detects large deceleration greater than a predetermined level applied to the vehicle, or a webbing sensor (belt retracting speed sensor) detects retraction of the seatbelt 3 at a predetermined speed, the lock means 5 prevents the spool 4 from rotating in the belt-extracting direction α.

A conventionally-known and widely-used force-limiting mechanism (not shown, energy absorbing mechanism referred to as "EA mechanism" hereafter) is provided between the spool 4 and the lock means 5 for limiting the load of the seatbelt 3 when the lock means 5 prevents the seatbelt 3 from unwinding. The EA mechanism may be formed of a conventionally-known torsion bar, so that when the lock means 5 prevents the seatbelt 3 from unwinding, the torsion bar is deformed to limit the load of the seatbelt 3, thereby absorbing impact energy.

As shown in FIGS. 1 and 2, the motor 6 is secured on a surface of the retainer 11 with a pair of screws 12 where the side wall 2b of the frame 2 is secured with three screws 10. A motor rotating shaft 6a of the motor 6 passes through a through hole 11a. A motor gear 13 having outer teeth is integrally and rotatably secured to the motor rotating shaft 6a protruding from the surface of the retainer 11 opposite to the surface for mounting the frame 2.

As shown in FIG. 1, a connector 14 is provided between the spool 4 with the EA mechanism (e.g., a torsion bar) and the reducing mechanisms 7a and 7b for connecting the same in the rotational direction. The connector 14 comprises a first rotary connecting portion 14a for connecting the spool 4 and the EA mechanism in the rotational direction; a second rotary connecting portion 14b for connecting a bearing 15 in the rotational direction, and a third rotary connecting portion 14c for connecting the reducing mechanism 7a and 7b formed in a spline shape in the rotational direction.

The first rotary connecting portion 14a is formed of a tube with a polygon shape (not clearly shown in FIG. 1). The first rotary connecting portion 14a is integrally and rotatably connected to the spool 4 through an outer surface thereof, and is integrally and rotatably connected to the EA mechanism (e.g., a torsion bar) through an inner surface thereof. Note that the connecting mechanisms for integrally and rotatably connecting the spool 4 and the EA mechanism, and the connector 14, are well known, and detailed description thereof are omitted.

The second rotary connecting portion 14b has an outer surface having a polygon cross section, and the connector bearing 15 has an inner surface having the same cross-section. The connector bearing 15 is fitted to the second rotary connecting portion 14b so as not to rotate relatively to each other. The connector bearing 15 is rotatably supported on a retainer bearing 16. The retainer bearing 16b is mounted to the retainer 11 with an opening 11b so as not to rotate relatively to each other, whereby the connector 14 is rotatably supported on the retainer 11.

The third rotary connecting portion 14c has engaging grooves such as spline grooves or the like extending in the axial direction thereof and formed at a predetermined pitch along the circumference direction thereof.

The high reduction ratio reducing mechanism 7a includes a circular carrier gear 17, a predetermined number of planetary gears 18 rotatably mounted on the carrier gear 17 (three planetary gears in the drawings), a ring-shaped ring member 19, and a sun gear member 20.

The carrier gear 17 has a predetermined number of engaging grooves such as spline grooves or the like on the inner surface 17a for engaging the connector 14, extending in the axial direction thereof and formed at a predetermined pitch. The predetermined number of engaging grooves formed on the inner surface 17a engage protrusions formed between the engaging grooves on the third rotary connecting portion 14c of the connector 14, and protrusions formed between the engaging grooves on the inner surface 17a engaging the engaging grooves on the third rotary connecting portion 14c (engaging in the same way as with "spline engaging"), thereby connecting the carrier gear 17 and the connector 14 so as not to rotate relatively to each other, i.e., so as to rotate integrally. Furthermore, outer teeth 17b are formed on the outer surface of the carrier gear 17.

The planetary gears 18 are rotatably mounted on the carrier gear 17 with reduction pins 22 through a reduction plate 21. The ring member 19 includes an internal gear 19a formed on the inner surface thereof and a ratchet wheel 19b formed on the outer surface thereof, so that the internal gear 19a and the ratchet wheel 19b rotate together.

Figure 3B:
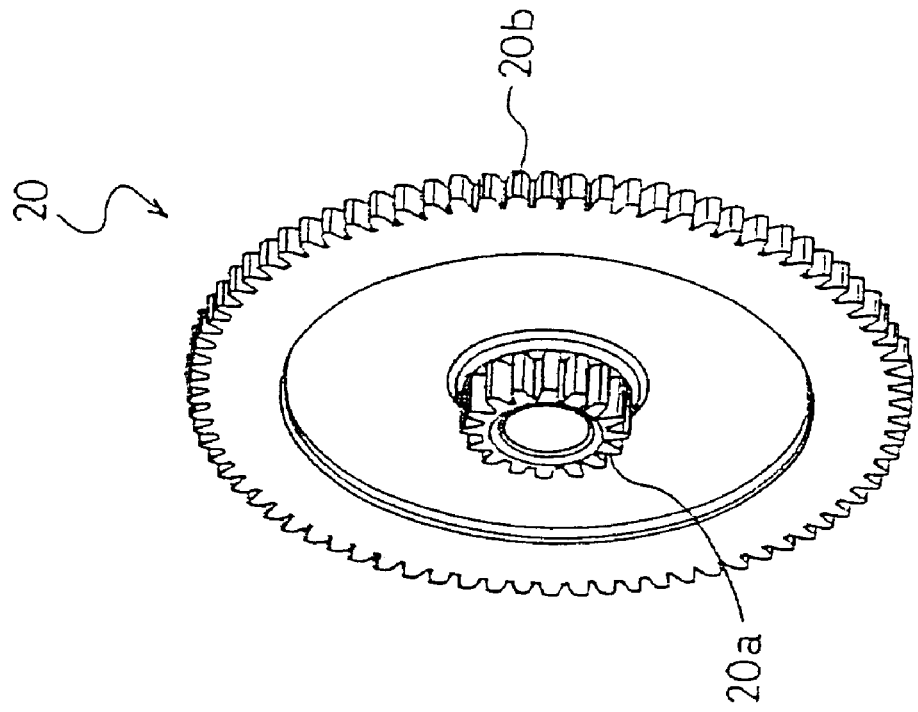
Figure 3A:
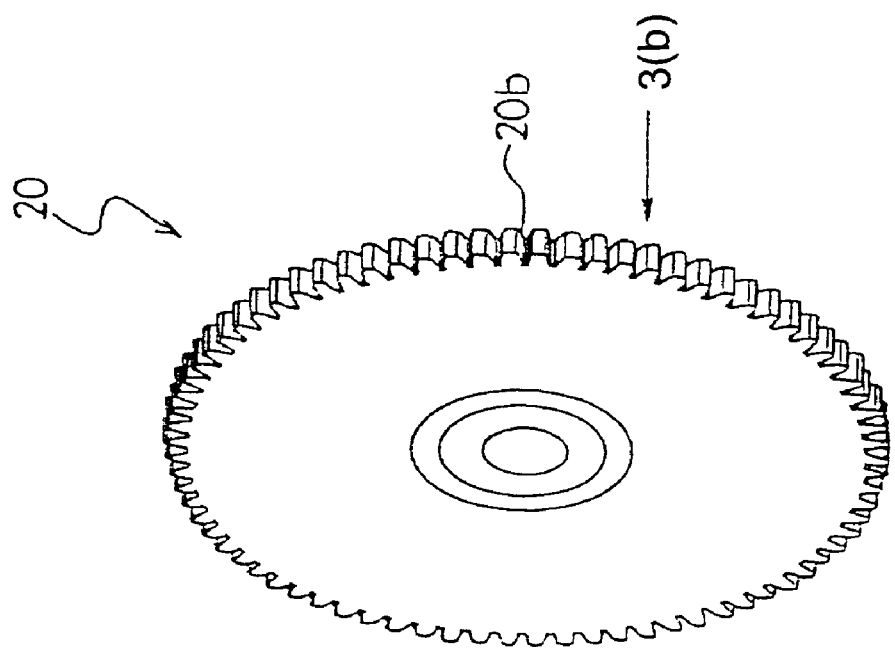

As shown in FIG. 3(a) and FIG. 3(b), the sun gear member 20 comprises a sun gear 20a formed of small-sized outer teeth and large-sized outer teeth 20b, so that the sun gear 20a and the outer teeth 20b rotate integrally. Each planetary gear 18 supported by the carrier gear 17 engages the sun gear 20a and the internal gear 19a all the time, thereby constituting a planetary gear mechanism. Accordingly, the reducing mechanism 7 constitutes a planetary gear reducing mechanism, in which the sun gear 20a is an input end and the carrier gear 17 is an output end.

As shown in FIG. 1, the power transmission mechanism 8 further includes a connecting gear 23; a pair of clutch springs 24; a pair of pulleys 25; a lower connecting gear 26 having outer teeth; an upper connecting gear 27 having outer teeth; a guide plate 28; and an idling gear 29 having outer teeth. The connecting gear 23 is rotatably supported with a rotating shaft 11c formed on the retainer 11, and includes a first connecting gear 23a formed of a large-diameter outer teeth and a small-diameter second connecting gear 23b, so that the first and second connecting gears 23a and 23b are rotated integrally. In this case, the large-diameter first connecting gear 23a engages the motor gear 13 all the time as shown in FIG. 2.

As shown in FIG. 1, rotating shafts 26a protrude from side surfaces of the lower connecting gear 26 (only one rotating shaft 26a shown in FIG. 1), and have a through hole 26b for inserting the rotating shafts 26a in the axial direction. Each rotating shaft 26a has a flat portion for fitting to a slot 25a of each pulley 25. Thus, the pulleys 25 are rotatably supported on the side surfaces of the lower connecting gear 26 so as to rotate integrally with the lower connecting gear 26. Each of the pulleys 25 engages the clutch spring 24 with a first curved connecting portion 24a. Furthermore, the upper connecting gear 27 is supported on one of the rotating shafts 26a of the lower connecting gear 26 so as to rotate integrally with the lower connecting gear 26. Furthermore, the pulleys 25, the lower connecting gear 26, and the upper connecting gear 27 are rotatably supported with a rotating shaft 11d protruding from the retainer 11.

The guide plate 28 is mounted to the retainer 11 in a state that a pair of openings 28a formed on the guide plate 28 is fitted into a pair of supporting shafts 11e protruding from the retainer 11 by inserting a pair of screws 30 into the corresponding openings 28a of the guide plate 28 and screwing a pair of screws 30 into a pair of screw holes 11f formed in the retainer 11. The idling gear 29 is rotatably supported by a rotating shaft 28c protruding from the guide plate 28. As shown in FIG. 2, the idling gear 29 engages the outer teeth 20b of the sun gear member 20, the small-sized second connecting gear 23b of the connecting gear 23, and the upper connecting gear 27 all the time.

The low reduction ratio reducing mechanism 7b comprises the upper connecting gear 27; the lower connecting gear 26; a clutch gear 31; and the carrier gear 17. Accordingly, the rotational torque of the motor 6 transmitted to the idling gear 29 is transmitted to the spool 4 through the low reduction ratio reducing mechanism 7b or the high reduction ratio reducing mechanism 7a.

Figure 5:
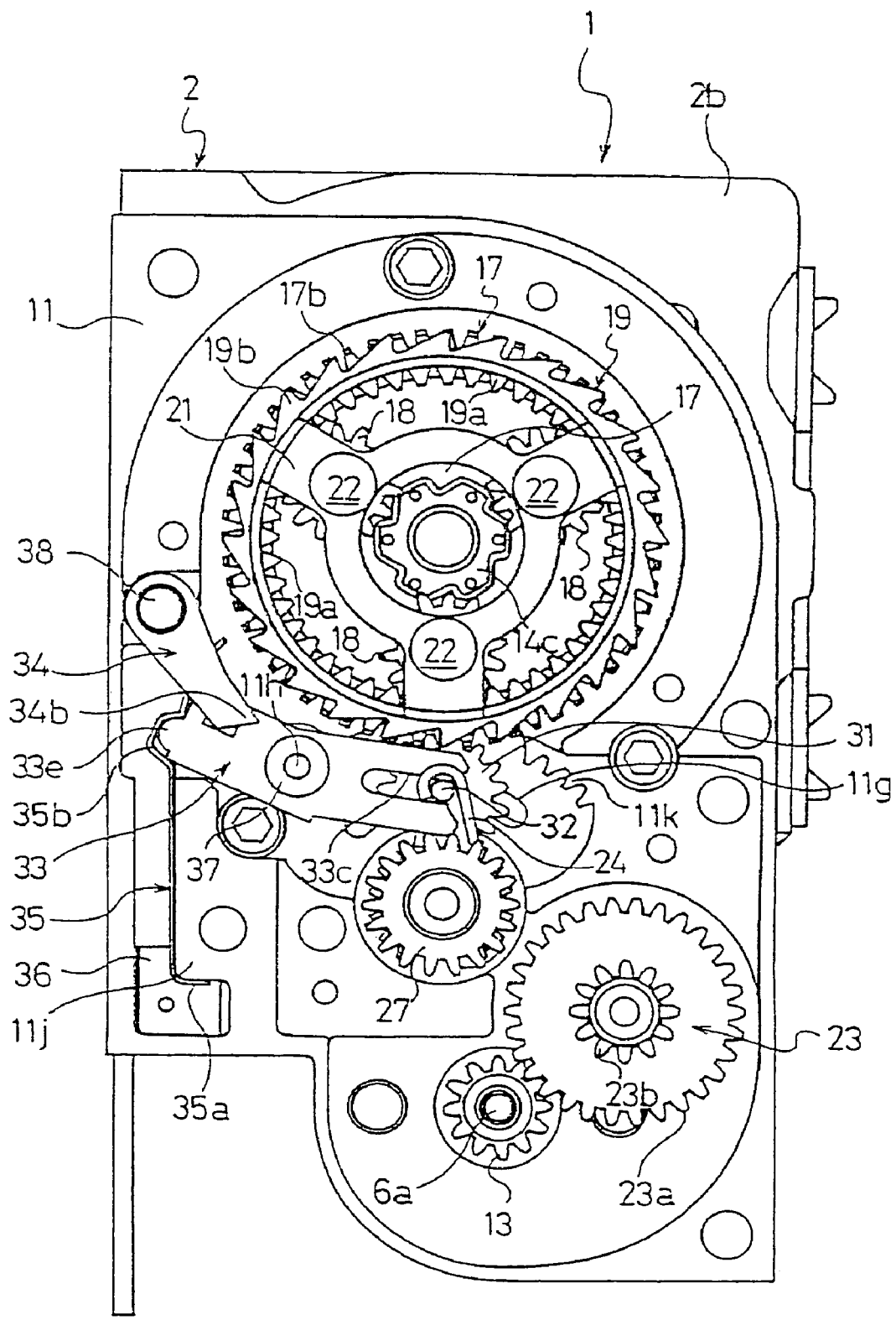
FIG. 5 is a left side view of the seatbelt retractor shown in FIG. 1 with a part of the components removed in a low reduction ratio power transmission mode.

As shown in FIG. 1, the power transmission mode switching mechanism 9 comprises the clutch gear 31 having outer teeth; a rotating shaft 32; a clutch arm 33; a clutch pawl 34; a resistance spring 35; and a spring stopper 36. As shown in FIG. 5, the clutch gear 31 engages the outer teeth 17b of the carrier gear 17 having a diameter greater than that of the clutch gear 31 and a lower connecting gear 26 (not shown, corresponding to a motor gear according to the present invention) all the time. A rotating shaft 32 passes through a center opening 31a so as to rotatably support the clutch gear 31.

The clutch arm 33 is formed of a pair of side walls 33a and 33b and a bottom wall (not shown), and has a U-shape cross-section. The side walls 33a and 33b have protruding bottom ends, and a straight supporting groove 33c is formed at the bottom ends. The clutch gear 31 is disposed between the bottom ends of the side walls 33a and 33b, and the rotating shaft 32 protruding from both side surfaces of the clutch gear 31 is supported by the supporting groove 33c to move along the supporting groove 33c. A pair of clutch springs 24 is connected to the protrusions protruding from the side walls 33a and 33b of the rotating shaft 32 at second curved connecting portions 24b thereof. Furthermore, an end of the rotating shaft 32 is fitted to a guide opening 11g formed in the retainer 11. The guide opening 11g is formed in an arc shape with the rotating shaft 11d as the center. Thus, the rotating shaft 32 is guided on the guide opening 11g so as to move along an arc with the rotating shaft 11d as the center.

The other ends of the side walls 33a and 33b include slots 33d and connecting portions 33e having an arc shape. Each of the middle portions of the side walls 33a and 33b in the longitudinal direction include a supporting opening 33f. The clutch arm 33 is rotatably supported on the retainer 11 by fitting a supporting shaft 11h protruding from the retainer 11 to the supporting openings 33f formed in the side walls 33a and 33b, and is fixed so as to not to come off by fixing an E ring 37 to the supporting shaft 11h.

Figure 4:
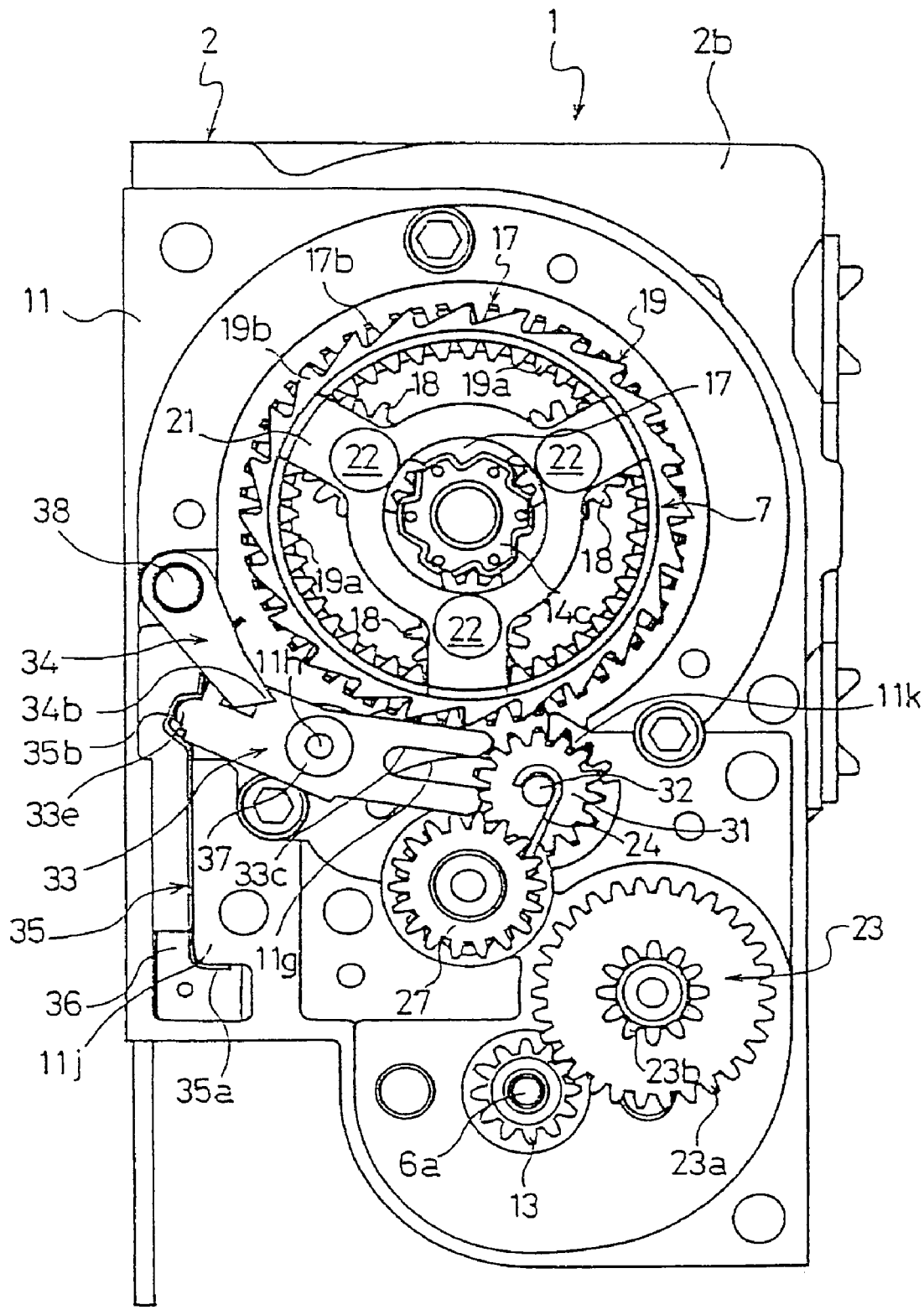
FIG. 4 is a left side view of the seatbelt retractor shown in FIG. 1 with a part of components removed in a power transmission disconnected mode.
Figure 6:
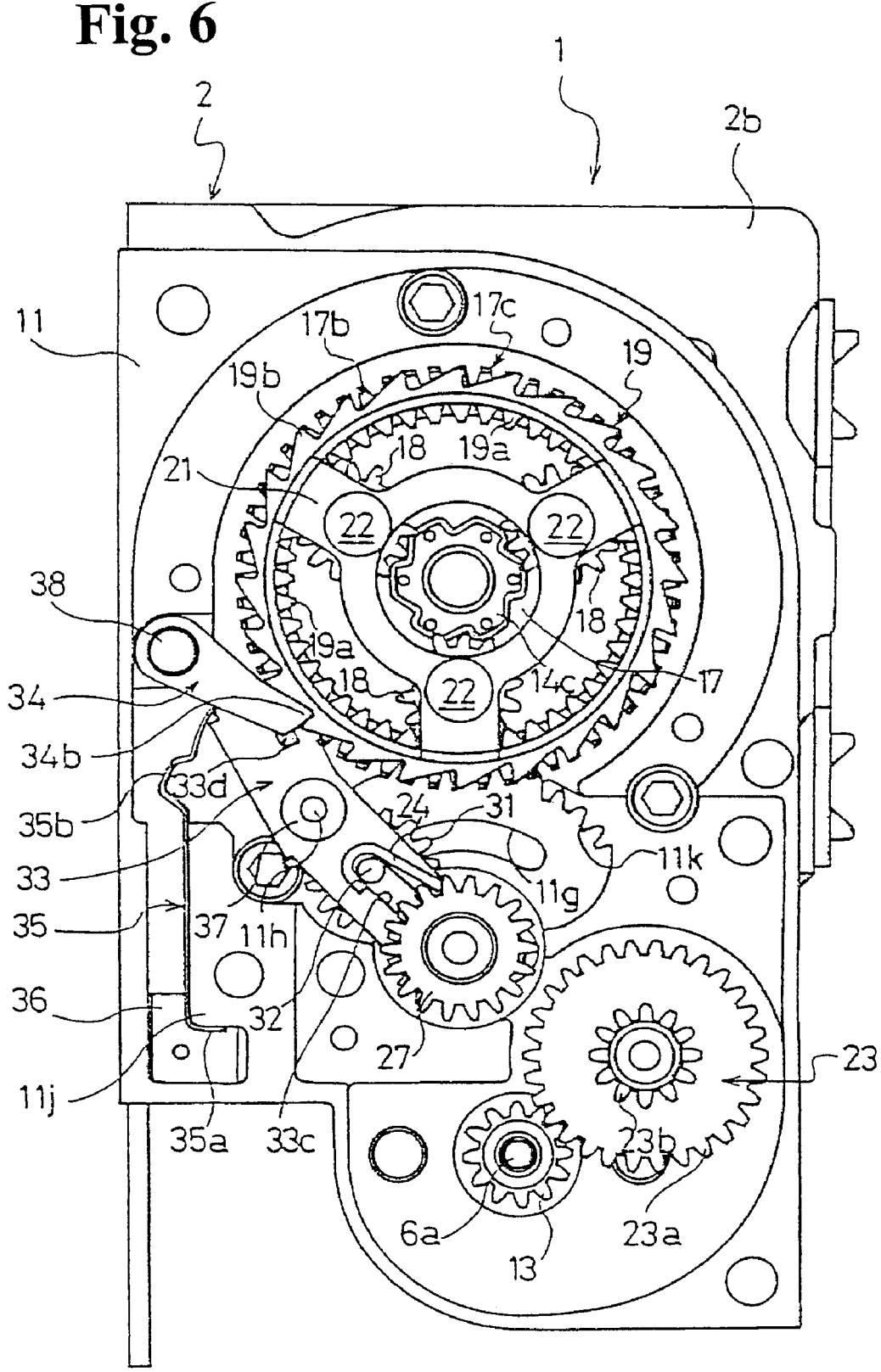
FIG. 6 is a left side view of the seatbelt retractor shown in FIG. 1 with a part of the components removed in a high reduction ratio power transmission mode.

The clutch pawl 34 includes a supporting opening 34a at one end thereof, and the other end serves as a connecting pawl 34b. Furthermore, the other end of the clutch pawl 34, i.e., the connecting pawl 34b, includes a connecting pin 34c erected thereon. The connecting pin 34c is fit to the slots 33d of the clutch arm 33 to move relatively to the clutch arm along the slots 33d. As shown in FIG. 4, a pawl pin 38 passes through the supporting opening 34a, and is inserted into and connected with a pin hole 11i formed in the retainer 11, so that the clutch pawl 34 is rotatably mounted to the retainer 11. As shown in FIG. 6, the connecting pawl 34b engages a ratchet wheel 19b so as to prohibit rotation of the ring member 19 in the clockwise direction (corresponding to the belt-extracting direction α of the spool 4), so that when the connecting pawl 34b engages the ratchet wheel 19b, rotation of the ring member 19 in the clockwise direction is prohibited.

The resistance spring 35 is formed of a belt-shaped plate spring, and has a lower end formed in an L-shape as a supporting portion 35a and a recess 35b formed in a U shape at a middle-upper portion in the longitudinal direction. A portion between the recess 35b and the supporting portion 35a is formed in a flat shape, and a portion between the recess 35b and the upper end is formed in a curved shape. The recess 35b is formed so as to engage the connecting portion 33e of the clutch arm 33. As shown in FIG. 4, in a state that the connecting portion 33e engages the recess 35b, the supporting groove 33c extends in a direction same as the tangential direction of an arc of the guide opening 11g, so that the rotating shaft 32 moves in direction from the guide opening 11g to the supporting groove 33c or from the supporting groove 33c to the guide opening 11g.

The clutch mechanism according to the present invention comprises the clutch springs 24, the pulleys 25, the lower connecting gear 26, the upper connecting gear 27, the idling gear 29, the clutch gear 31, the rotating shaft 32, the clutch arm 33, the clutch pawl 34, and the resistance spring 35. The spring stopper 36 is formed in an L-shape, and the supporting portion 35a is held between the spring stopper 36 and a spring mounting portion 11j formed on the retainer 11, so that the resistance spring 35 is mounted on the retainer 11 with the upper end as a free end and the lower end as a fixed end.

As shown in FIGS. 1, 4, and 6, the retainer 11 includes a clutch gear stopping/holding portion 11k formed of inner teeth (corresponding to noise preventing means and clutch gear stopping and holding means). In the power transmission disconnected mode as shown in FIG. 4, wherein the rotating shaft 32 contacts the right end of the guide opening 11g so that the clutch gear 31 is positioned at the most-right position, the clutch gear 31 engages the inner teeth of the clutch gear stopping/holding portion 11k so as to stop rotation of the clutch gear 31 in the counterclockwise direction, and maintain the stopped state.

The components, i.e. the reducing mechanism 7, power transmission gear mechanism 8, and power transmission mode switching mechanism 9, are mounted within recesses formed in the face of the retainer 11 opposite to the face for mounting the frame 2, and a retainer cover 39 is mounted with a predetermined number (four in the drawings) of screws 40 to cover the components.

The power transmission gear mechanism 8 has the following three power transmission modes.

(1) Power Transmission Disconnected Mode

As shown in FIG. 4, in the power transmission disconnected mode, the connecting portion 33e of the clutch arm 33 forming the power transmission mode switching mechanism 9 engages the recess 35b of the resistance spring 35. In the state wherein the connecting portion 33e engages the recess 35b, the connecting pawl 34b of the clutch pawl 34 does not engage the ratchet wheel 19b of the ring member 19 so as to allow rotation of the ring member 19. Accordingly, the torque transmission path (low speed and high torque transmission path described later) between the sun gear member 20 and the carrier gear 17 is disconnected.

On the other hand, the rotating shaft 32 contacts the right end of the guide opening 11g so as to position the clutch gear 31 at the most-right position, i.e. a power off position (clutch off position). The clutch gear 31 positioned at the power off position engages the inner teeth of the clutch gear stopping/holding portion 11k and is away from the outer teeth 17b of the carrier gear 17, so that the clutch gear 31 does not rotate in the counterclockwise direction. Accordingly, the torque transmission path between the clutch gear 31 and the carrier gear 17 (high-speed and low-torque transmission path) is disconnected. As a result, in the power transmission disconnected mode, the spool 4 and the motor 6 are not connected so that the rotational torque of the motor 6 is not transmitted to the spool 4, and the rotational torque of the spool 4 is not transmitted to the motor 6.

(2) Low Reduction Ratio Power Transmission Mode

As shown in FIG. 5, in the low reduction ratio power transmission mode, the connecting portion 33e of the clutch arm 33 engages the recess 35b of the resistance spring 35 in the same way as in the power transmission disconnected mode. In the state wherein the connecting portion 33e engages the recess 35b, the connecting pawl 34b of the clutch pawl 34 does not engages the ratchet wheel 19b of the ring member 19 so as to allow rotation of the ring member 19. Accordingly, the low speed and high torque transmission path between the sun gear member 20 and the carrier gear 17 is disconnected.

On the other hand, the rotating shaft 32 is positioned at the uppermost position (closest to the rotating shaft of the spool 4) at the middle portion of the guide opening 11g so as to position the clutch gear 31 at the uppermost position (closest to the rotating shaft of the spool 4). The clutch gear 31 at the uppermost position engages the outer teeth 17b of the carrier gear 17. Accordingly, the clutch gear 31 is positioned at the connected position wherein the high-speed and low-torque transmission path between the clutch gear 31 and the carrier gear 17 is connected. That is, the motor 6 is connected to the spool 4 through the motor gear 13, the connecting gear 23, the idling gear 29, the upper connecting gear 27, the lower connecting gear 26, the clutch gear 31, the carrier gear 17, and the connector 14. Accordingly, the low reduction ratio power transmission path is selected. The rotating shaft 32 at the uppermost position is inserted into the supporting groove 33c of the clutch arm 33 so as to contact the clutch arm 33.

As described above, in the low reduction ratio power transmission mode, the high-speed and low-torque transmission path is selected. In the low reduction ratio power transmission-mode, it is possible to quickly retract the seatbelt with the motor 6.

(3) High Reduction Ratio Power Transmission Mode

As shown in FIG. 6, in the high reduction ratio power transmission mode, the connecting portion 33e of the clutch arm 33 separates from the recess 35b of the resistance spring 35, and is positioned at the curve portion of the resistance spring 35 at an upper position of the recess 35b. In the state wherein the connecting portion 33e separates from the recess 35b, the connecting pawl 34b of the clutch pawl 34 engages the ratchet wheel 19b of the ring member 19 so as to prohibit rotation of the ring member 19 in the clockwise direction. That is, the low speed and high torque transmission path between the sun gear member 20 and the carrier gear 17 is connected. Accordingly, the motor 6 is connected to the spool 4 through the motor gear 13, the connecting gear 23, the idling gear 29, the outer teeth 20b of the sun gear member 20, the sun gear 20a, the planetary gears 18, the carrier gear 17, and the connector 14. As a result, the high reduction ratio power transmission path by the planetary gear mechanism is selected.

On the other had, the rotating shaft 32 contacts the left end of the guide opening 11g so as to position the clutch gear 31 at the most left position. The clutch gear 31 at the most left position separates from the outer teeth 17b of the carrier gear 17. Accordingly, the high speed and low torque transmission path between the clutch gear 31 and the carrier gear 17 is disconnected. In the high reduction ratio power transmission mode, the low speed and high torque transmission path is selected. In the high reduction ratio power transmission mode, the seatbelt is retracted with a high tension by the motor 6.

As described above, the clutch gear 31 can move between the connected position for connecting the power transmission path and the disconnected position for disconnecting the power transmission path. The power transmission mode switching mechanism 9 selects the power transmission mode from one of the power transmission disconnected mode, the low reduction ratio power transmission mode, and the high reduction ratio power transmission mode.

(1) Switching from the Power Transmission Disconnected Mode to the Low Reduction Ratio Power Transmission Mode In the power transmission disconnected mode shown in FIG. 4, when the motor 6 rotates forward (rotation of the motor rotating shaft 6a in the clockwise direction in FIG. 4 corresponding to rotation of the spool 4 in the belt-retracting direction α), the lower clutch gear 26 and the pulleys 25 are rotated in the direction corresponding to the belt-retracting direction α of the spool 4 through the motor gear 13, the connecting gear 23, the idling gear 29, and the upper clutch gear 27. In this case, while the clutch gear 31 rotates in the direction corresponding to the belt-retracting direction α, i.e. the clockwise direction in FIG. 4, the clutch gear 31 engages the inner teeth of the clutch gear stopping/holding portion 11k, and the rotating shaft 32 is free from any resistance. Accordingly, the clutch springs 24 turn in the same direction as the pulleys 25. Accordingly, the clutch gear 31 and the rotating shaft 32 move in the left direction along the guide opening 11g.

When the clutch gear 31 and the rotating shaft 32 move toward the left side by a predetermined distance, the clutch gear 31 separates from the inner teeth of the clutch gear stopping/holding portion 11k so as to enable rotation without any load, and then the rotating shaft 32 contacts the clutch arm 33 as shown in FIG. 5.

In the state wherein the rotating shaft 32 contacts the clutch arm 33, the clutch gear 31 and the rotating shaft 32 are positioned at the uppermost positions as shown in FIG. 5, and the clutch gear 31 engages the outer teeth 17b of the carrier gear 17. Accordingly, rotation of the clutch gear 31 is transmitted to the carrier gear 17, whereby the carrier gear 17 is rotated. In this case, if the seatbelt 3 has slack, the seatbelt 3 is wound onto the spool 4 by rotation of the carrier gear 17. When the seatbelt is wound, the spool 4 does not rotate and the carrier gear 17 does not rotate. Accordingly, the clutch gear 31 does not rotate due to resistance applied from the carrier gear 17.

On the other hand, the lower connecting gear 26 is forced to rotate due to rotational torque of the motor 6, and accordingly, force is applied to the rotating shaft 32 so as to move toward the most left position due to rotational torque of the lower connecting gear 26. In this case, the rotating shaft 32 contacts the clutch arm 33, and accordingly, the clutch arm 33 is pressed by the rotating shaft 32. However, at this time, the seatbelt 3 is tightened with a force less than a predetermined tension. Accordingly, the momentum for rotating the clutch arm 33 in the clockwise direction due to pressing force applied from the rotating shaft 32 is smaller than the momentum for preventing rotation of the clutch arm 33 in the clockwise direction due to the connection between the connecting portion 33e and the recess 35b. Accordingly, the connecting portion 33e does not separate from the recess 35b, the clutch arm 33 is not turned, and the rotating shaft 32 is stopped at the position where the rotating shaft 32 contacts the clutch arm 33.

As described above, the rotating shaft 32 is stopped, and accordingly, the clutch gear 31 and the rotating shaft 32 are held at the uppermost positions as shown in FIG. 5. The clutch gear 31 is held at the uppermost position, thereby maintaining the engagement between the clutch gear 31 and the outer teeth 17b of the carrier gear 17, and connection of the high speed and low torque transmission path between the clutch gear 31 and the carrier gear 17. Furthermore, the clutch arm 33 is not turned, and accordingly, the clutch pawl 34 is not turned, thereby holding the connecting pawl 34b at a position where the connecting pawl 34b does not engage the ratchet wheel 19b. As a result, the ring member 19 rotates freely and maintains the disconnection of the low speed and high torque transmission path between the sun gear member 20 and the carrier gear 17. Accordingly, the power transmission mode of the power transmission mechanism 8 is switched from the power transmission disconnected mode to the low reduction ratio power transmission mode, whereby the power transmission mechanism 8 becomes the low reduction ratio power transmission mode.

(2) Switching from the Low Reduction Ratio Power Transmission Mode to the High Reduction Ratio Power Transmission Mode The high reduction ratio power transmission mode is set by relatively high rotational torque of the motor 6. In this case, the power transmission mode is switched from the power transmission disconnected mode to the high reduction ratio power transmission mode through the low reduction ratio power transmission mode. Switching of the power transmission mode from the power transmission disconnected mode to the low reduction ratio power transmission mode is performed in the same way as described above. However, at the time of setting the power transmission mode to the high reduction ratio power transmission mode, the tension of the seatbelt 3 is greater than a predetermined value. Accordingly, the momentum applied to the clutch arm 33 due to the pressing force from the rotating shaft 32 is greater than the momentum for preventing rotation of the clutch arm 33 in the clockwise direction due to connection of the connecting portion 33e with the recess 35b. As a result, the connecting portion 33e separates from the recess 35b.

When the clutch springs 24 rotate further in the counterclockwise direction, the rotating shaft 32 moves toward the left side along the guide opening 11g while the clutch arm 33 rotates around the supporting shaft 11h in the clockwise direction. Accordingly, the clutch gear 31 further moves in the left direction as well. When the rotating shaft 32 contacts the left end of the guide opening 11g, the rotating shaft 32 does not move further, and the clutch gear 31, the rotating shaft 32, and the clutch springs 24 are stopped. Accordingly, as shown in FIG. 6, the clutch gear 31 and the rotating shaft 32 are positioned at the most left positions. The clutch gear 31 at the most left position separates from the outer teeth 17b of the carrier gear 17, and accordingly, the high speed and low torque transmission path between the clutch gear 31 and the carrier gear 17 is disconnected.

On the other hand, the clutch pawl 34 rotates around the clutch pawl pin 38 in the counter clockwise direction along with the rotation of the clutch arm 33, and the connecting pawl 34b is positioned at a position to engage the ratchet wheel 19b as shown in FIG. 6. In this case, the sun gear member 20 rotates by rotational torque of the motor 6, and the ring member 19 rotates in the clockwise direction. Accordingly, the ratchet wheel 19b engages the connecting pawl 34b, and the ring member 19 stops, so that the low speed and high torque transmission path between the sun gear member 20 and the carrier gear 17 is connected.

As described above, switching of the power transmission mode of the power transmission mechanism 8 is performed from the low reduction ratio power transmission mode to the high reduction ratio power transmission mode, whereby the power transmission mechanism 8 becomes the high reduction ratio power transmission mode.

(3) Switching from the High Reduction Ratio Power Transmission Mode to the Power Transmission Disconnected Mode through the Low Reduction Power Transmission Mode In the high reduction ratio power transmission mode shown in FIG. 6, when the motor 6 rotates in the reverse direction (rotation of the motor rotating shaft 6a in the counterclockwise direction, corresponding to rotation of the spool 4 in the belt-extracting direction α), the lower connecting gear 26 and the pulleys 25 rotate in the reverse direction. Also, the clutch springs 24 rotate in the reverse direction. Accordingly, the clutch gear 31 and the rotating shaft 32 move in the right direction along the guide opening 11g while turning the clutch arm 33 in the counterclockwise direction.

At the same time, the clutch pawl 34 turns in the clockwise direction corresponding to turning of the clutch arm 33 in the counterclockwise direction. Accordingly, the clutch pawl 34 is positioned at the disconnected position where the clutch pawl 34 is not connected to the ratchet wheel 19b. The ring member 19 rotates freely, and the low speed and high torque transmission path is disconnected.

When the clutch gear 31 and the rotating shaft 32 reach the uppermost positions, the clutch gear 31 engages the outer teeth 17b of the carrier gear 17. Accordingly, the power transmission mechanism 8 temporarily becomes the low reduction ratio power transmission mode shown in FIG. 5. The clutch gear 31 immediately separates from the outer teeth 17b due to continuous movement of the clutch gear 31 and the rotating shaft 32 in the right direction, and the clutch gear 31 rotates freely. Accordingly the high speed and low torque transmission path is connected, and then immediately disconnected. When the high speed and low torque transmission path is connected temporarily, the motor 6 rotates in the reverse direction, and the spool 4 temporarily rotates in the belt-extracting direction α and stops.

The rotating shaft 32 moves from the uppermost position in the right direction and separates from the clutch arm 33. The clutch gear 31 and the rotating shaft 32 further move in the right direction due to further turning of the clutch springs 24 in the reverse direction. Accordingly, the clutch gear 31 engages the inner teeth of the clutch gear stopping/holding portion 11k. The rotating shaft 32 contacts the right end of the guide opening 11g and stops. Accordingly, the clutch gear 31, the rotating shaft 32, and the clutch springs 24 are stopped. The clutch gear 31 and the rotating shaft 32 are positioned at the power transmission disconnecting positions, i.e. the most right positions shown in FIG. 4 described above. In this case, the clutch gear 31 engages the inner teeth of the clutch gear stopping/holding portion 11k and stops.

As described above, the power transmission mode of the power transmission mechanism 8 is switched from the high reduction ratio power transmission mode to the power transmission disconnected mode, whereby the power transmission mechanism 8 becomes the power transmission disconnected mode. An operation of stopping the motor 6 will be described later.

According to the present embodiment, the seatbelt retractor 1 has the following belt modes of the seatbelt 3. The belt modes include a belt storage mode wherein the seatbelt 3 is not worn by the passenger and is completely wound onto the spool 4; a belt extracting mode wherein the seatbelt 3 is extracted from the spool 4 so as to be worn by the passenger; a fitting belt retracting mode wherein the seatbelt 3 is fit to the passenger in a situation where the passenger wear the seatbelt 3; a normal wearing mode (comfortable mode) wherein the passenger wears the seatbelt 3 in a normal situation without any pressure; a warning mode wherein in an event that the system detects dozing off of the driver or an obstacle in front of the vehicle in the direction of movement, the seatbelt 3 is retracted repeatedly predetermined times for warning the driver; an emergency mode wherein in an event that the vehicle extremely likely have a collision with an obstacle or the like while moving, the seatbelt 3 is retracted so as to restrain the passenger with an extremely strong belt tension; and a storing belt retracting mode wherein the seatbelt 3 is retracted so as to be completely wound onto the spool 4 when the passenger does not wear the seatbelt 3.

Figure 7:
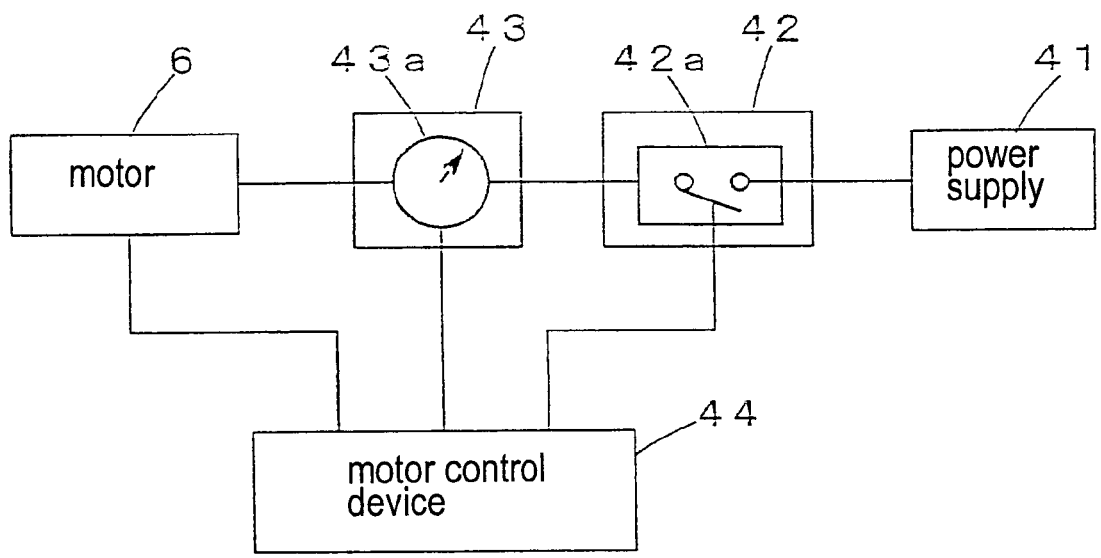
FIG. 7 is a view showing a seatbelt device provided with the seatbelt retractor shown in FIG. 1.

In the seatbelt retractor 1 according to the present embodiment, when the clutch gear 31 is positioned at the disconnected position in the power transmission disconnected mode shown in FIG. 4 from the low reduction ratio power transmission mode shown in FIG. 5, or the high reduction ratio power transmission mode shown in FIG. 6, the motor 6 automatically stops. FIG. 7 is a circuit diagram for automatically stopping the motor 6 and controlling the motor 6 to set the belt modes described above.

As shown in FIG. 7, the motor 6 is connected to a power supply 41 through electric power supply switching means 42 and clutch mechanism disconnection detecting means 43. The electric power supply switching means 42 controls electric power supply from the power supply 41 to the motor 6, and is formed of a relay switch 42a, for example. The clutch mechanism disconnection detecting means 43 detects a situation wherein the clutch gear 31 is positioned at the disconnected position and the clutch is completely disconnected, and is formed of a motor current detector (corresponding to motor current detecting means) 43a for detecting a motor current I(A) flowing in the motor 6.

The motor 6, electric power switching means 42, and clutch mechanism disconnection detecting means 43 are connected to a motor control device (referred to as "CPU" hereafter) 44. The CPU 44 controls on/off of the electric power supply switching means 42 and a rotational direction (forward or reverse) of the motor 6 corresponding to the selected belt mode when the belt mode is selected. In this case, the CPU 44 controls the motor 6 to automatically stop as described above according to a detected signal of the motor current I(A) detected by the motor current detector 43a.

That is, the motor 6 rotates in the reverse direction so as to switch the power transmission mode from the low reduction ratio power transmission mode sown in FIG. 5 to the power transmission disconnected mode shown in FIG. 4. In the low reduction ratio power transmission mode shown in FIG. 5, the clutch gear 31 engages the outer teeth 17b of the carrier gear 17, so that the clutch gear 31 receives resistance while rotating. Accordingly, the motor current I (A) increases to a current $I_1$ (A) shown in FIG. 8 due to the load of the motor 6 from the resistance of the clutch gear 31.

Figure 8:
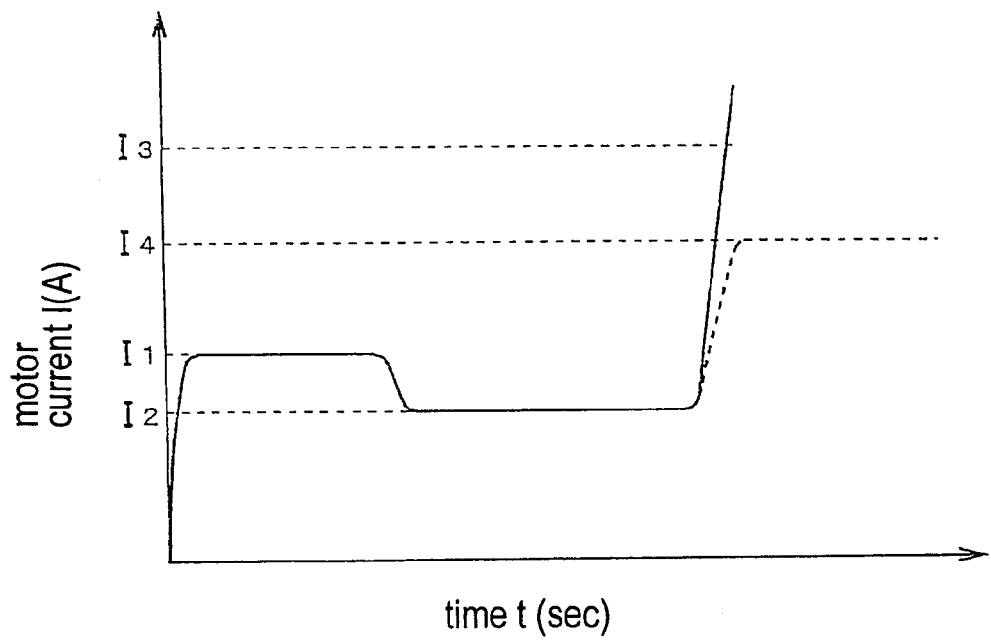
FIG. 8 is a chart showing a change in a motor current.

When the clutch gear 31 rotates and separates from the outer teeth 17b of the carrier gear 17 while the clutch gear 31 and the rotating shaft 32 move from the position shown in FIG. 5 in the right direction, the clutch gear rotates without any load, so that the load of the motor 6 decreases and the motor current I (A) decreases to a lower current $I_2$ (A) lower than the current $I_1$ (A) shown in FIG. 8.

When the clutch gear 31 reaches the disconnected position, the clutch gear 31 stops, so that the load of the motor 6 increases, and the motor current I (A) increases relatively rapidly as shown by a solid curve in FIG. 8. When the motor current I (A) reaches a predetermined current $I_3$ (A) (threshold value according to the present invention), the motor current detector 43a detects the predetermined current $I_3$ (A). The CPU 44 determines that the clutch gear 31 reaches the disconnected position according to the predetermined current $I_3$ (A) detected by the motor current detector 43a, and the relay switch 42a is turned off. Accordingly, the power supply from the power supply 41 to the motor 6 is stopped to stop the motor 6.

With the seatbelt retractor 1 having such a configuration, the power transmission mechanism 8 includes two power transmission paths, i.e. the high speed and low torque power transmission path serving as the low reduction ratio power transmission mode, and the low speed and high torque power transmission path serving as the high reduction ratio power transmission mode. Accordingly, the seatbelt retractor 1 has two functions, i.e. rapid belt retraction for winding the seatbelt 3 in the low reduction ratio power transmission mode, and high-torque belt retraction for restraining the passenger in the high reduction ratio power transmission mode.

According to the present embodiment, the rotational torque of the motor 6 is efficiently transmitted to the spool 4 through selecting the two power transmission paths, thereby performing the two modes of retracting the seatbelt in a sure manner with small power consumption. In particular, with the seatbelt retractor 1 according to the present embodiment, high-torque seatbelt retraction is performed for restraining the passenger through the low speed and high torque power transmission path, so that the motor 6 is driven with small rotational torque as compared with the conventional one. Thus, a small-sized motor is employed as the motor 6, as well as driving the motor with reduced power consumption, thereby reducing the size of the seatbelt retractor 1.

Furthermore, with the seatbelt retractor 1 according to the present embodiment, the power transmission mechanism 8 becomes the power transmission mode selected from the low reduction ratio power transmission mode and the high reduction ratio power transmission mode according to the tension of the seatbelt 3, thereby easily performing mode switching without controlling rotational torque of the motor 6. The power transmission mechanism 8 has the power transmission disconnected mode wherein rotational torque of the motor 6 is not transmitted to the spool 4. Accordingly, extraction of the seatbelt 3, normal wearing of the seatbelt 3 without any pressure, and storage of the seatbelt 3 are performed without an influence of the motor 6.

Furthermore, the high reduction ratio reducing mechanism 7a is formed of a planetary gear mechanism, thereby reducing the size of the low speed and high torque transmission path. The size of the seatbelt retractor 1 including both the low reduction ratio power transmission mode and the high reduction ratio power transmission mode is also reduced.

Furthermore, the carriers of the high reduction ratio reducing mechanism 7a and the outer teeth 17b of the low reduction ratio reducing mechanism 7b form a single carrier gear 17, thereby reducing the size of the seatbelt retractor 1 and the number of the components thereof. The power transmission mode switching mechanism 9 controls the internal gear 19a of the planetary gear mechanism to rotate and controls the small-diameter clutch gear 31 to engage the outer teeth 17b of the large-diameter carrier gear 17 according to a tension of the seatbelt 3, thereby easily switching the power transmission mode.

Furthermore, when the clutch gear 31 is positioned at the disconnected position, the clutch gear 31 engages the inner teeth of the clutch gear stopping/holding portion 11k, the clutch gear 31 is stopped, thereby increasing the load of the motor 6. Accordingly, the motor current I (A) increases, thereby detecting the disconnected position of the clutch gear 31, i.e. complete disconnection of the clutch, in a sure manner. Thus, it is possible to minimize the period of time for rotating the motor 6 in the reverse direction after the clutch is disconnected, thereby effectively reducing power consumption of the motor 6. The clutch gear 31 is stopped at the disconnected position, thereby reducing noise due to rotation of the clutch gear 31 and other gears in a sure manner.

Figure 9:
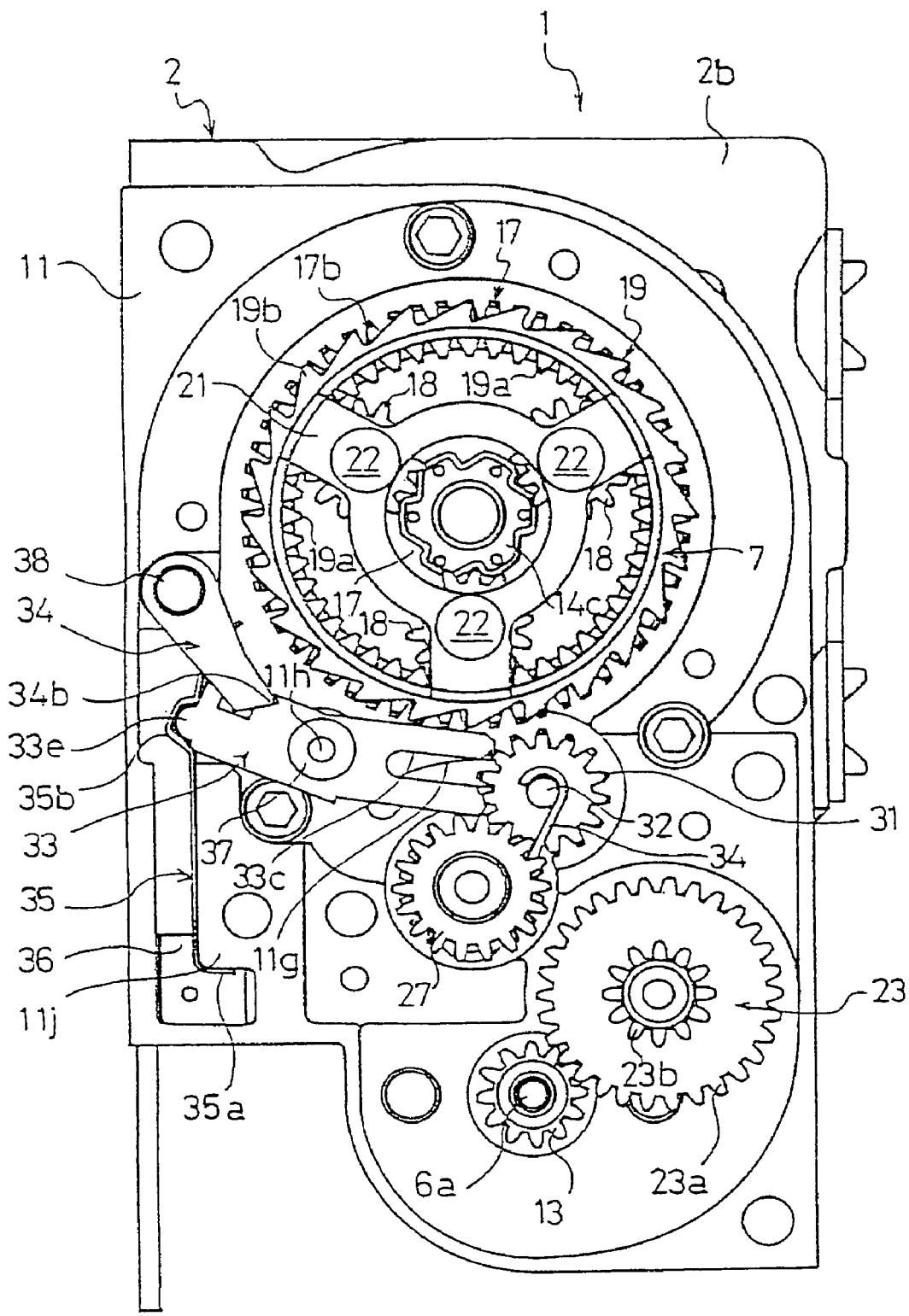
FIG. 9 is a diagram showing another embodiment of the present invention corresponding to FIG. 4.

FIG. 9 shows a seatbelt retractor according to another embodiment of the present invention corresponding to FIG. 4. In the embodiment described above, the clutch gear stopping/holding portion 11k formed of the inner teeth is provided on the retainer 11. In the seatbelt retractor 1 according to the present embodiment, the clutch gear stopping/holding portion 11k is omitted as shown in FIG. 9.

In the seatbelt retractor 1 having such a configuration, when the motor 6 rotates in the reverse direction to switch the power transmission mode from the low reduction ratio power transmission mode shown in FIG. 5 to the power transmission disconnected mode shown in FIG. 4, the motor current I (A) changes from the current $I_1$ (A) to the current $I_2$ (A).

When the clutch gear 31 reaches the disconnected position, the rotating shaft 32 stops moving in the right direction and the clutch springs 24 stops rotating in the clockwise direction as shown in FIG. 9. While the clutch gear 31 continues free rotation, the clutch springs 24 engage the rotating shaft 32 due to friction. Accordingly, the clutch gear 31 receives resistance due to the rotating of the clutch springs 24 stopping, thereby increasing the load of the motor 6 (clutch springs 24 forming resistance applying means according to the present invention).

Accordingly, as shown in FIG. 8, the motor current I (A) temporarily decreases from the current $I_1$ (A) to the current $I_2$ (A) in the same way as described above. Then, the motor current I (A) increases at a rate relatively lower than before as indicated by a hidden line, and reaches a current $I_4$ (A) greater than the current $I_1$ (A). The motor current detector 43a detects the current $I_4$ (A) corresponding to the threshold value according to the present invention. The CPU 44 determines that the clutch gear 31 reaches the disconnected position according to the current $I_4$ (A) detected by the motor current detector 43a, and the relay switch 42a is turned off. Accordingly the power supply from the power supply 41 to the motor 6 is stopped to stop the motor 6.

The seatbelt retractor 1 according to the present embodiment does not include the clutch gear stopping/holding means 11k formed of the inner teeth unlike the embodiment described above, thereby making the structure simple. Note that the seatbelt retractor 1 according to the present embodiment has other configuration and advantages same as those of the embodiment described above.

In the present embodiment, the motor current I (A) is monitored to determine whether the clutch gear 31 reaches the disconnected position, and the present invention is not limited to the arrangement. Alternatively, other means such as contact-type detecting means such as a limit switch or the like, or non-contact type detecting means such as an optical sensor, magnetic sensor, or the like may be used.

The power transmission mode switching means is not limited to the power transmission mode switching mechanism 9 using high torque and low torque of the motor 6. Alternatively, a mechanism such as a solenoid or the like may be used as the power transmission mode switching means.

Furthermore, the single carrier gear 17 does not need to be formed of the high reduction ratio reducing mechanism 7a and the low reduction ratio mechanism 7b, and may be formed of other members.

Furthermore, the motor 6 has the constant rotational torque during switching of the power transmission mode. Alternatively, the rotational torque of the motor 6 is controlled according to the belt modes such as the fitting belt retracting mode, the warning mode, the emergency mode, the belt storage mode, and the like.

The seatbelt retractor according to the present invention is suitable for a vehicle such as an automobile or the like for retracting a seatbelt for restraining and protecting the passenger by a motor.

Figure 10:
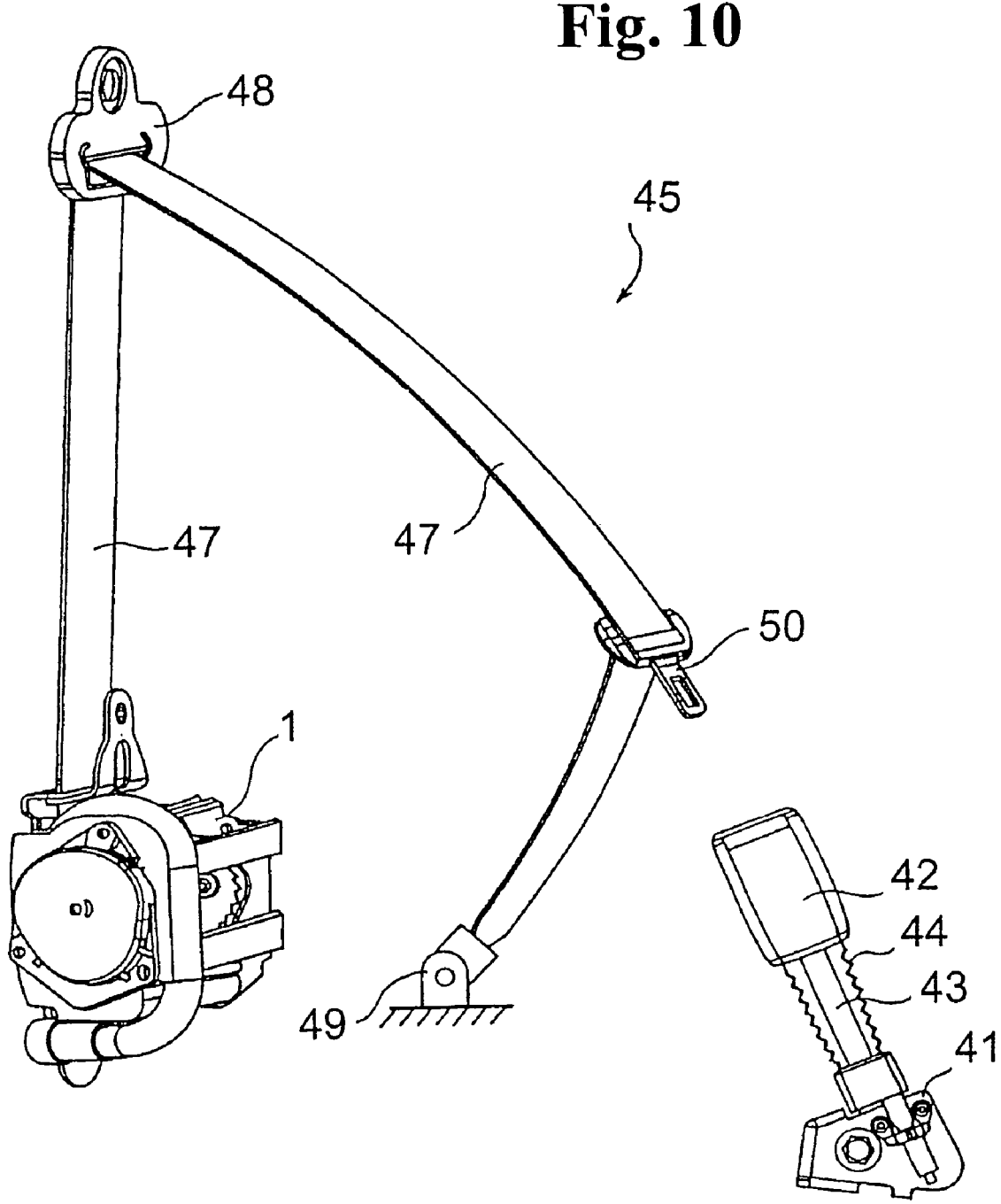
FIG. 10 is a view showing a seat belt device provided with the seat belt retractor shown in FIG. 1.

FIG. 10 is a view showing a seatbelt device provided with the seatbelt retractor 1 shown in FIG. 1. As shown in FIG. 10, a seatbelt device 45 includes the seatbelt retractor 1 fixed to a portion of a vehicle body such as a vehicle floor and the like; a belt guide 48 attached to a portion of the vehicle body such as a center pillar and the like for guiding a seatbelt 47 extending from the seatbelt retractor 1 into a predetermined position relative to an occupant; an anchor 49 fixed to a portion of the vehicle body such as a floor and the like on an outer side of a vehicle seat and to which an end of the seatbelt 47 is connected; a tongue 50 slidably supported to the seatbelt 47; a buckle 42 fixed to a portion of the vehicle body such as a floor and the like on an inner side of the vehicle seat and to which the tongue 50 can be latched; a buckle supporting member 41 for supporting the buckle 42; a connecting member 43 connecting the buckle supporting member 41 and the buckle 42; and a boot 44 disposed between the buckle 42 and the buckle supporting member 41.

The disclosure explained in the specification and shown in the drawings in Japanese Patent Application No. 2003-355294 filed on Oct. 15, 2003 is hereby incorporated into the present application.

While the invention has been explained with reference to the specific embodiments of the invention, the explanation is illustrative and the invention is limited only by the appended claims.

What is claimed is:

1. A seatbelt retractor comprising:
   a spool for winding a seatbelt,
   a motor for generating rotational torque to rotate the spool,
   a power transmission path situated between spool and the motor,
   a clutch mechanism attached to the power transmission path for allowing the power transmission path to transmit the rotational torque of the motor to the spool in a connected mode, and for prohibiting the power transmission path to transmit the rotational torque to the spool in a disconnected mode,
   a clutch mechanism disconnection detecting device for detecting disconnection of the clutch mechanism, and
   a motor control device connected to the motor for stopping the motor according to a clutch disconnection signal from the clutch mechanism disconnection detecting device.

2. A seatbelt retractor according to claim 1, wherein said clutch mechanism disconnection detecting device includes a motor current detecting device for detecting a motor current of said motor, said motor control device stopping the motor when a motor current detection signal from the motor current detecting device becomes a predetermined value.

3. A seatbelt retractor according to claim 2, wherein said clutch mechanism moves between a connected position for connecting the power transmission path and a disconnected position for disconnecting the power transmission path, and includes a clutch gear for always engaging a gear connected to the motor.

4. A seatbelt retractor according to claim 3, wherein said clutch mechanism further includes a clutch gear stopping/holding device for stopping the clutch gear when the clutch gear is positioned at the disconnected position.

5. A seatbelt retractor according to claim 4, wherein said clutch gear stopping/holding device is formed of teeth for engaging the clutch gear.

6. A seatbelt retractor according to claim 4, wherein said clutch mechanism further includes a clutch arm engaging a shaft of the clutch gear, said clutch arm and clutch gear changing their positions according to a rotation of the motor.

7. A seatbelt retractor according to claim 6, further comprising a retainer for supporting the spool, said retainer having a guide opening for supporting the shaft of the clutch gear so that the clutch gear moves along the guide opening while being held by the clutch arm.

8. A seatbelt retractor according to claim 2, wherein said clutch mechanism disconnection detecting device further includes a relay switch connected to the motor current detecting device and the motor control device, said motor control device operating the relay switch to stop supplying power to the motor through the motor current detecting device when the motor current detection signal becomes the predetermined value.

9. A seatbelt device comprising the seatbelt retractor according to claim 1, the seatbelt, a tongue for passing the seatbelt, and a buckle for engaging the tongue.

10. A seatbelt retractor according to claim 3, wherein said clutch mechanism further includes a resistance applying device for applying resistance to the clutch gear when the clutch gear is positioned at the disconnected position.

11. A seatbelt retractor according to claim 3, wherein said clutch mechanism includes, in the connected mode, a low reduction ratio power transmission mode for quickly retracting the seatbelt with the motor, and a high reduction ratio power transmission mode for retracting the seatbelt with a high tension.

12. A seatbelt retractor according to claim 11, wherein said high reduction ratio power transmission mode is changed through the low reduction ratio power transmission mode from the disconnected mode.

13. A seatbelt retractor according to claim 12, wherein said low reduction ratio power transmission mode quickly retracts the seatbelt after the seatbelt is withdrawn, and said high reduction ratio power transmission mode retracts the seatbelt for restraining a passenger.

14. A seatbelt retractor according to claim 13, wherein said lower reduction ratio power transmission mode or high reduction ratio power transmission mode is selected according to a tension of the seatbelt.

* * * * *